(12) United States Patent
Depner et al.

(10) Patent No.: US 10,534,657 B2
(45) Date of Patent: Jan. 14, 2020

(54) DISTRIBUTED GRAPH PROCESSING SYSTEM THAT ADOPTS A FASTER DATA LOADING TECHNIQUE THAT REQUIRES LOW DEGREE OF COMMUNICATION

(71) Applicant: Oracle International Corporation, Redwood Shores, CA (US)

(72) Inventors: Siegfried Depner, Sunnyvale, CA (US); Sungpack Hong, Palo Alto, CA (US); Thomas Manhardt, Augsburg (DE); Jinsu Lee, San Mateo, CA (US); Nicholas Roth, San Jose, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 268 days.

(21) Appl. No.: 15/607,985

(22) Filed: May 30, 2017

(65) Prior Publication Data

US 2018/0352026 A1    Dec. 6, 2018

(51) Int. Cl.
*G06F 15/16* (2006.01)
*G06F 11/00* (2006.01)

(52) U.S. Cl.
CPC .................................. *G06F 11/00* (2013.01)

(58) Field of Classification Search
CPC ........ G06F 8/453; G06F 9/5038; G06F 17/16; G06F 17/10; G06F 11/3433;

(Continued)

(56) References Cited

U.S. PATENT DOCUMENTS 6,041,306 A    3/2000  Du
7,167,850 B2   1/2007  Stanfill
(Continued)

FOREIGN PATENT DOCUMENTS

WO    WO2015099562 A1    7/2015

OTHER PUBLICATIONS

Tian et al., From "Think Like a Vertex" to "Think Like a Graph", 40th International Conference on Very Large Data Bases, dated Sep. 2014, Proceedings of the VLDB Endowment, vol. 7, No. 3, 12 pgs.

(Continued)

*Primary Examiner* — Cheikh T Ndiaye
(74) *Attorney, Agent, or Firm* — Hickman Palermo Becker Bingham LLP; Brian N. Miller

(57) ABSTRACT

Techniques minimize communication while loading a graph. In a distributed embodiment, each computer loads some edges of the graph. Each edge connects a source vertex (SV) to a destination vertex. For each SV of the edges, the computer hashes the SV to detect a tracking computer (TrC) that tracks on which computer does the SV reside. Each computer informs the TrC that the SV originates an edge that resides on that computer. For each SV, the TrC detects that the SV originates edges that reside on multiple providing computers (PCs). The TrC selects a target computer (TaC) from the multiple PCs to host the SV. The TrC instructs each PC, excluding the TaC, to transfer the SV and related edges that are connected to the SV to the TaC. A vertex's internal identifier indicates which computer hosts the vertex. The TrC maintains a mapping between external and internal identifiers.

20 Claims, 5 Drawing Sheets

(58) Field of Classification Search
CPC .... G06F 16/278; G06F 3/061; G06F 16/9024; G06F 11/1076; G06F 3/002; G06F 9/3851; G06F 9/50; G06F 11/00; G06F 9/38; G06F 3/00; H04L 67/1051; H04L 9/06; H04L 43/045; H04L 41/0896; H04L 43/0876; H04L 67/10; H04L 29/08
See application file for complete search history.

(56) References Cited

U.S. PATENT DOCUMENTS

| | | | |
|---|---|---|---|
| 7,322,033 B2 | 1/2008 | Ito | |
| 7,757,214 B1 | 7/2010 | Palcazk | |
| 8,266,289 B2 | 9/2012 | Saha | |
| 8,312,464 B2 | 11/2012 | Arimilli | |
| 8,321,492 B1 | 11/2012 | Sengupta et al. | |
| 8,607,249 B2 | 12/2013 | Otenko | |
| 8,631,094 B1* | 1/2014 | Alpert | G06F 16/9024 709/219 |
| 8,645,429 B1 | 2/2014 | Bik | |
| 9,183,058 B2 | 11/2015 | Li | |
| 9,189,457 B2 | 11/2015 | Le Goff | |
| 9,361,154 B2 | 6/2016 | Booman | |
| 9,385,845 B1 | 7/2016 | Austern | |
| 9,477,532 B1 | 10/2016 | Hong et al. | |
| 9,535,756 B2 | 1/2017 | Depner et al. | |
| 9,577,911 B1 | 2/2017 | Castleman | |
| 9,639,407 B1 | 5/2017 | Braverman | |
| 9,652,286 B2 | 5/2017 | Fan | |
| 9,740,536 B2 | 8/2017 | Van der Lugt et al. | |
| 9,838,242 B2 | 12/2017 | Tully | |
| 9,852,230 B2 | 12/2017 | Fleury | |
| 9,928,124 B2 | 3/2018 | Vagg | |
| 10,002,205 B2 | 6/2018 | Roth et al. | |
| 10,089,761 B2 | 10/2018 | Viswanathan | |
| 2005/0256893 A1* | 11/2005 | Perry | G06F 16/9027 |
| 2007/0294665 A1 | 12/2007 | Papakipos | |
| 2008/0098375 A1* | 4/2008 | Isard | G06F 9/5066 717/149 |
| 2009/0097418 A1 | 4/2009 | Castillo et al. | |
| 2009/0112784 A1 | 4/2009 | Brun | |
| 2009/0248754 A1 | 10/2009 | Lipton | |
| 2012/0158858 A1 | 6/2012 | Gkantsidis | |
| 2012/0166645 A1 | 6/2012 | Boldyrev | |
| 2012/0303685 A1 | 11/2012 | Ulrich | |
| 2012/0304192 A1 | 11/2012 | Grove | |
| 2012/0317579 A1 | 12/2012 | Liu | |
| 2012/0324472 A1 | 12/2012 | Rossbach | |
| 2013/0031550 A1 | 1/2013 | Choudhury | |
| 2013/0042254 A1 | 2/2013 | Archer | |
| 2013/0086328 A1 | 4/2013 | Frank | |
| 2014/0096138 A1 | 4/2014 | Dean | |
| 2014/0108489 A1 | 4/2014 | Glines | |
| 2014/0115596 A1 | 4/2014 | Khan | |
| 2014/0130056 A1 | 5/2014 | Goodman | |
| 2014/0181831 A1 | 6/2014 | Le Scouarnec | |
| 2014/0215477 A1 | 7/2014 | Chen | |
| 2014/0317292 A1 | 10/2014 | Odom | |
| 2014/0317635 A1 | 10/2014 | Konno | |
| 2014/0337850 A1 | 11/2014 | Iniguez | |
| 2015/0007182 A1 | 1/2015 | Rossbach | |
| 2015/0135185 A1 | 5/2015 | Sirota | |
| 2015/0149503 A1 | 5/2015 | Wollrath | |
| 2015/0187042 A1 | 7/2015 | Gupta | |
| 2016/0063037 A1 | 3/2016 | Savkli | |
| 2016/0140152 A1 | 5/2016 | Sevenich | |
| 2016/0217007 A1 | 7/2016 | Ueno | |
| 2016/0292303 A1 | 10/2016 | Hong | |
| 2017/0032064 A1 | 2/2017 | Walsh | |
| 2017/0124452 A1 | 5/2017 | Tucker | |
| 2017/0127466 A1 | 5/2017 | Narasimha | |
| 2017/0147706 A1 | 5/2017 | Roth et al. | |
| 2017/0168751 A1 | 6/2017 | Stevens | |
| 2017/0199758 A1 | 7/2017 | Gschwind | |
| 2017/0351551 A1 | 12/2017 | Manhardt | |
| 2018/0039709 A1* | 2/2018 | Chen | G06F 9/547 |
| 2018/0039710 A1* | 2/2018 | Chen | G06F 16/24568 |
| 2018/0210761 A1 | 7/2018 | Lee et al. | |
| 2019/0102154 A1 | 4/2019 | Koupy | |

OTHER PUBLICATIONS

Then et al., "Evaluation of Parallel Graph Loading Techniques", ACM, GRADES 2016 , Jun. 24, 2016, Redwood Shores, 6 pages.
Low et al., "Distributed GraphLab: Aa Framework for Machine Learning and Data Mining in the Cloud", Proceedings of the VLDB Endowment, vol. 5, No. 8, dated 2012, 12 pages.
Gonzalez, "GraphX: Graph Processing in a Distributed Dataflow Framework", Proceedings of the 11th USENIX Symposium on Operating Systems Design and Implementation, dated Oct. 2014, 16 pages.
Gonzalez et al., "PowerGraph: Distributed Graph-Parallel Computation on Natural Graphs", 10th USENIX Symposium on Operating Systems Design and Implementation, dated 2012, 14 pages.
Roth et al., "PGX.D/Async: A Scalable Distributed Graph Pattern Matching Engine", ACM, dated May 19, 2017, 6 pages.
Presta et al., "Large-scale Graph Partitioning with Apache Giraph", Engineering Blog, Facebook Code, dated Apr. 9, 2014, 8 pages.
Nelson et al., "Latency-Tolerant Software Distributed Shared Memory", dated Jul. 10, 2015, 15 pages.
Karypis, George,METIS, A Software Package for Partitioning Unstructured Graphs, Partitioning Meshes, and Computing Fill-Reducing Orderings of Sparse Matrices Version 5.1.0, dated Mar. 30, 2013, 35pgs.
Gonzalez et al., "GraphX Processing in a Distributed Dataflow Framework", https://amplab.cs.berkeley.edu/wp-content/uploads/2014/09/graphx.pdf, dated 2014, 15 pages.
Yuan et al., "PathGrapg: A Path Centric Graph Processing System", IEEE transactions on Parallel and Distributed Systems, vol. 27, No. 10, dated Oct. 10, 2016.
Mccune et al., "Thinking Like a Vertex: A Survery of Vertex-Centric Frameworks for Large-Scale Distributed Graph Processing", ACM Computing Surveys, vol. 48, No. 2, dated Oct. 10, 2016.
Mathew et al., "An Efficient Index based Query handling model for Neo4j", International Journal of Advances in Computer Science and Technology (IJACST), vol. 3 No. 2, dated 2014, 7 pages.
Dave et al., "GraphFrames: An Integrated API for Mixing Graph and Relational Queries", ACM, dated 2016, 8 pages.

* cited by examiner

DISTRIBUTED GRAPH PROCESSING SYSTEM THAT ADOPTS A FASTER DATA LOADING TECHNIQUE THAT REQUIRES LOW DEGREE OF COMMUNICATION

FIELD OF THE DISCLOSURE

This disclosure relates to distributed graph processing. Techniques for minimizing communication while load balancing a graph are presented.

BACKGROUND

Graph analysis is a recently popularized methodology in data analytics. In graph analysis, a dataset is represented as a graph where data entities become vertices, and relationships between them become edges of the graph. Through this graph representation, it may be tractable to analyze fine-grained relationships between data entities.

While graph analysis may need in-memory execution for quick analysis of large data, graph-processing systems often provide distributed execution mode as well. That is, the large graph data is loaded into the aggregated (though not necessarily shared) memory of multiple computers, while each computer only loads up a portion of the data.

A typical workflow for a distributed graph processing system may involve these steps:
1. Load graph data from external sources such as files, databases, network connections, etc.
2. Transform the data into an internal data representation for the distributed graph processing system
3. Perform some form of distributed processing on the data such as algorithmic analysis
4. Transform the output data from the internal data representation to the external data representation and present and/or save the results for the user A problem may be that steps 1-2 usually take too long for large graphs. Furthermore, because steps 3-4 are possibly executed multiple times, step 2 may be performed in a way that optimizes the internal representation to accelerate steps 3-4. For example, graph data may be distributed to available computers to horizontally balance the workload of steps 3-4.

Note that a graph processing system may have its own internal representation of graph data, which may involve assigning a unique internal identifier to each vertex of the graph. For accelerated access, the graph processing system may encode the location of a vertex's data within the internal identifier of the vertex.

However, there may be challenges for building or maintaining the internal identifier of a vertex:
1. Available computers should agree on the internal identifier of the vertex. This may be aggravated if multiple computers simultaneously load graph data
2. The graph data instead includes the external (natural or otherwise original) identifier of the vertex.
3. Internal and external identifiers may subsequently be expected in different contexts after loading.

Some of these problems were partially solved by having all available computers load the whole graph. However, that approach may have fundamental problems such as loading latency, memory exhaustion, and coherence.

Another solution was to apply a global hash function to vertices to decide which machine should solely load and exclusively own a vertex. However, this approach may have fundamental problems such as network latency, network congestion, and workload imbalance. The amount of vertices per computer is more or less arbitrarily determined by the hash function instead of by requirements of the analysis application or graph system. If the hash function distributes the vertices unevenly, then system throughput may degrade. Furthermore if each computer only reads its own portion of the graph data, then communication may be irregular, which may aggravate contention. For example, hashed access to an underlying (e.g. original) data store may be random access, which is irregular and may be difficult to perform in bulk. Furthermore, hashing does not simplify generation of internal identifiers.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Example Distributed System
    2.1 Graph
    2.2 Partition
    2.3 Conflict
    2.4 Informing
    2.5 Tracking
      2.5.1 Hashing
      2.5.2 Loading
      2.5.3 Batch
    2.6 Operation
    2.7 Selecting
    2.8 Instruct
  3.0 Tracking Process
    3.1 Loading
      3.1.1 Vertex
      3.1.2 Informing
    3.2 Tracking
      3.2.1 Conflict
      3.2.2 Instruct
    3.3 Transfer
  4.0 Mapping
    4.1 External Identifier
    4.2 Internal Identifier 4.3 Offset
4.4 Conflict
4.5 Transfer
5.0 Outbound
5.1 Resolution
   5.1.1 Scan
   5.1.2 Random Access
6.0 Hardware Overview

1.0 General Overview

Techniques are provided for minimizing communication while load balancing a graph by decoupling vertex loading from vertex tracking. In a distributed embodiment, each computer of multiple computers loads a respective subset of edges of the graph. Each edge of the respective subset of edges connects a source vertex of the graph to a destination vertex of the graph. For each source vertex of the respective subset of edges, each computer hashes the source vertex to detect a tracking computer that tracks on which computer does the source vertex reside. Each computer informs the tracking computer that the source vertex originates an edge that resides on that computer.

For each source vertex that is tracked by the tracking computer, the tracking computer detects that the source vertex originates edges that respectively reside on at least two providing computers. The tracking computer selects a target computer from the at least two providing computers to host the source vertex. The tracking computer instructs each providing computer of the at least two providing computers, excluding the target computer, to transfer to the target computer the source vertex and related edges of the respective subset of edges of the providing computer that are connected to the source vertex.

In embodiments, each vertex has an existing external identifier that is globally unique. The distributed system also generates an internal identifier that is globally unique for each vertex. In embodiments, the internal identifier indicates which computer hosts the vertex. In embodiments, the tracking computer maintains a mapping between an external identifier and an internal identifier of a vertex. In embodiments, the multiple computers ask the tracking computer for the information of the mapping.

2.0 Example Distributed System

Figure 1:
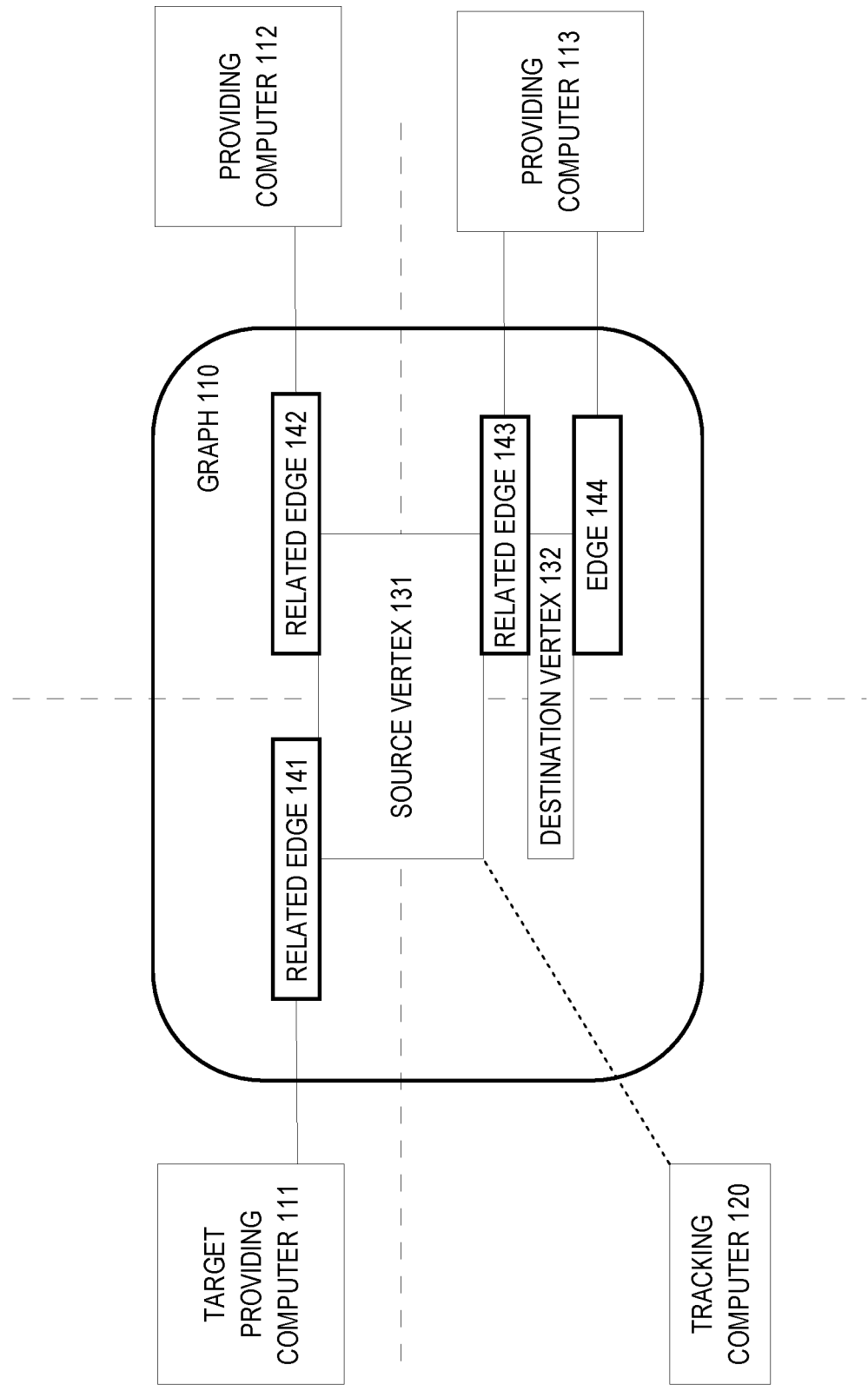
FIG. 1 is a block diagram that depicts an example distributed system that minimizes communication while load balancing a graph, in an embodiment.

FIG. 1 is a block diagram that depicts an example distributed system 100, in an embodiment. Distributed system 100 minimizes communication while load balancing a graph.

Distribute system 100 includes at least two computers, such as 111-113 and 120. Computers 111-113 and 120 may each be a rack server such as a blade, a personal computer, a mainframe, a network appliance, a virtual machine, a smartphone, or another computing device. Computers 111-113 and 120 may access data that is stored in memory, on disk, or over a network.

2.1 Graph

The computers of distributed system 100 include at least two computers that each hosts a portion of graph 110. Graph 110 may be a distributed graph and a directed graph.

Graph 110 contains edges, such as 141-144. Each of edges 141-144 may be a directed edge that originates at a source vertex and terminates at a destination vertex.

For example, related edge 143 originates at source vertex 131 and terminates at destination vertex 132. A vertex may be both a source vertex and a destination vertex for different edges.

For example, vertex 132 may originate edge 144 and terminate edge 143. Although not shown, a vertex may have a self (reflexive) edge that originates and terminates at the (same) vertex.

2.2 Partition

Horizontal scaling may be achieved by loading a different subset of the edges of graph 110 into each available computer. For demonstration, FIG. 1 shows a graph 110 divided into portions by dashed lines.

Each shown portion of edges may be loaded into a respective computer. For example edges 143-144 are loaded into computer 113; edge 142 is loaded into computer 112; and edge 141 is loaded into computer 111.

For load balancing, the edges of graph 1110 are divided into nearly equal amounts of edges. For example, computers 111-113 may each load its subset of edges from a central repository such as a cross-mounted file or a remote database.

Apportionment of edges may be straightforward. For example, each of computers 111-113 may load a subset of edges that are contiguous within a central file.

For example if graph 110 has 300 edges, which are stored as an array in a file, then: (a) computer 111 may load a first hundred contiguous edges from the file; (b) computer 112 may load a second hundred edges from the file; and (c) computer 113 may load the last hundred edges. Vertices 131-132 should also be loaded into available computers.

2.3 Conflict

However, apportioning vertices may be more complicated. Distributed system 100 attempts to preserve locality when loading vertices, such that a vertex may be loaded by a same computer that loads an edge that originates at the vertex.

However, conflicts over a vertex may arise because a vertex may originate many edges, which are loaded on various computers. For example, source vertex 131 originates edges 141-143 that reside on different computers 111-113.

Avoiding redundant loading by requiring that each edge and each vertex be loaded onto only one computer may be important for various reasons. For example, redundant loading may cause data incoherence.

Also for example, each vertex and each edge may have some or all properties whose loading may be deferred. Multiple computers redundantly loading the same properties for a same edge or vertex may waste time and memory.

To ensure that vertex 131 resides on only one computer, distributed system 100 chooses one computer for vertex 131 based on which computers do the departing edges of vertex 131 reside on. However, such choosing may be difficult because no single computer of distributed system 100 initially knows on which computers do the edges of vertex 131 initially reside.

For example, detecting which computers load which edges may be straightforward, but detecting that edges 141-143 are connected to a same vertex, 131, may be difficult without additional communication. Thus, each particular computer of computers 111-113 may inform distributed system 100 which vertices originate edges that are loaded by the particular computer.

2.4 Informing

Thus after all edges are loaded, distributed system 100 may know (as informed) that source vertex 131 originates edges that are loaded by computers 111-113. However, informing distributed system 100 about which vertices involve which computers may entail much network communication.

For example, graph 110 may have a trillion edges. Communicating information about the vertices of graph 110 to a central computer may saturate a network interface card (NIC) of the central computer and cause excessive contention at the central computer's local area network (LAN) switch.

For example, sustained degradation by switch contention, packet collisions, and exponential back off may cause Ethernet to waste half of its bandwidth. Distributed system 100 minimizes this congestion penalty by decentralizing responsibility for the assignment of vertices 131-132.

2.5 Tracking

Tracking computers, such as 120, may take responsibility for assigning storage of vertices to available computers. In embodiments, some or all of computers 111-113 and 120 may store vertices and edges.

In embodiments, some or all of computers 111-113 and 120 may assign storage of vertices to computers. A computer with responsibility to assign storage of vertices to computers is a tracking computer, such as 120.

2.5.1 Hashing

Each of vertices 131-132 may be tracked by a respective tracking computer. Which computer tracks which vertices may be decided by a hash function that may hash vertex identifiers and/or properties to map to tracking computers. Each vertex hashes to only one tracking computer.

For example, source vertex 131 may hash to tracking computer 120 for tracking. Destination vertex 132 may hash to a same or different tracking computer.

Such hashing may more or less evenly distribute tracking responsibility to tracking computers. Such distribution may prevent network hotspots that may cause congestion.

For example, related edges 141-143 originate from source vertex 131. Related edges 141-143 is each loaded by a respective providing computer of 111-113.

In operation, each of providing computers 111-113 detects its own loading of an edge that originates from source vertex 131. Each of providing computers 111-113 applies a same hash function to source vertex 131 to detect that source vertex 131 is tracked by tracking computer 120.

2.5.2 Loading

Each of providing computers 111-113 informs tracking computer 120 that the providing computer has loaded an edge that originates from source vertex 131. Providing computers 111-113 may load other edges that originate from other vertices that has to other tracking computers.

A providing computer may load multiple edges that originate from a same source vertex. In embodiments, the providing computer may announce to a tracking computer the identity of the source vertex and a count of edges that the providing computer loaded and that originate from the source vertex.

For example, providing computer 113 also loads edge 144 that originates from vertex 132, which may hash to a tracking computer other than 120. Thus, each of providing computers 111-113 may inform many tracking computers about many vertices.

In embodiments, tracking computer 120 may assign storage responsibility for source vertex 132 to whichever providing computer of 111-113 first informs tracking computer 120 about source vertex 132. In embodiments, tracking computer 120 may wait to assign source vertex 132 until all computers that load edges of graph 110 have informed tracking computer 120.

2.5.3 Batch

In embodiments, providing computer 112 buffers announcements of source vertices that hash to tracking computer 120 until a threshold amount is exceeded. Providing computer then flushes its buffer by informing tracking computer 120 about a batch of source vertices.

Providing computer 112 may have a separate buffer for each tracking computer. Each buffer may independently exceed the threshold at different times.

After flushing its buffer to tracking computer 120, providing computer 112 may refill and again flush its buffer to tracking computer 120. Whether finally flushing its buffer for a last time, or separately informing tracking computer 120 of an individual source vertex, providing computer 112 may include a flag or other indicator that designates that providing computer 112 has no more source vertices to inform tracking computer 120.

2.6 Operation

In embodiments, tracking computer 120 does not assign storage of source vertices to providing computers until all computers that load edges of graph 110 have indicated to tracking computer 120 that tracking computer 120 has been informed of all source vertices. For example, providing computers 111-113 may load their respective edges, inform various tracking computers about source vertices, and then send each tracking computer an indication that all source vertices have been reported.

Although not clearly shown, vertex 132 might originate only edges loaded by providing computer 113 and may hash to tracking computer 120. Thus, providing computer 113 may be the only computer that informs tracking computer 120 about vertex 132.

Thus, tracking computer 120 may detect that there is no storage conflict for vertex 132, because vertex 132 originates only edges that are loaded by one providing computer. Thus, tracking computer 120 need not resolve a storage conflict for vertex 132.

However, source vertex 131 originates related edges 141-143 that are loaded by providing computers 111-113. Thus source vertex 131 has a storage conflict, because each of providing computers 111-113 redundantly loads source vertex 131.

As shown, source vertex 131 hashes to (and is tracked by) tracking computer 120. Tracking computer 120 may detect that source vertex 131 has a conflict between providing computers 111-113.

2.7 Selecting

Tracking computer 120 may resolve the conflict by selecting one of providing computers 111-113 to retain source vertex 131 in memory. Tracking computer 120 may select which providing computer randomly or based on selection criteria.

Tracking computer 120 may use selection criteria that optimizes a performance characteristic. In embodiments, selection criteria selects whichever providing computer has the most available memory of the conflicting computers. In embodiments, selection criteria selects whichever providing computer has the least source vertices or least edges of the conflicting computers.

Tracking computer 120 selects a target computer, such as 111, to retain source vertex 131 from among the conflicting computers. Tracking computer 120 informs the remaining conflicting computers, such as providing computers 112-113 to transfer any edges that originate from source vertex 131 to target providing computer 111.

Although not shown, more of the edges that originate from source vertex 131 may be have been loaded by providing computer 111 than by providing computers 112-113. In embodiments, tracking computer 120 selects target providing computer 111 to retain source vertex 131 because target providing computer 111 had loaded more edges of source vertex 131 than other providing computers. Such a selection may minimize how many edges should providing computers transfer to the target computer.

2.8 Instruct

As instructed by tracking computer 120, providing computers 112-113 transfer related edges 142-143 to target providing computer 111. Tracking computer 120 records that target providing computer 111 stores source vertex 131. Computers of distributed system may subsequently ask tracking computer 120 to report which providing computer stores source vertex 131, and tracking computer 120 accordingly answers that target providing computer 111 does.

Eventually all of the tracking computers, such as 120, will have instructed the providing computers of distributed system 100 to transfer edges of particular source vertices to particular target computers. Likewise, eventually all of the providing computers will have responsively transferred edges to target computers as instructed.

Thus, distributed system 100 achieves more or less balanced redistribution of all edges of graph 110 such that a source vertex resides on a same providing computer that stores all of the source vertex's originated edges. Thus, distributed system 100 may: (a) load balance edges and/or vertices amongst all available computers, (b) minimize edge transfers, and (c) collocate each edge with its source vertex.

3.0 Tracking Process

Figure 2:
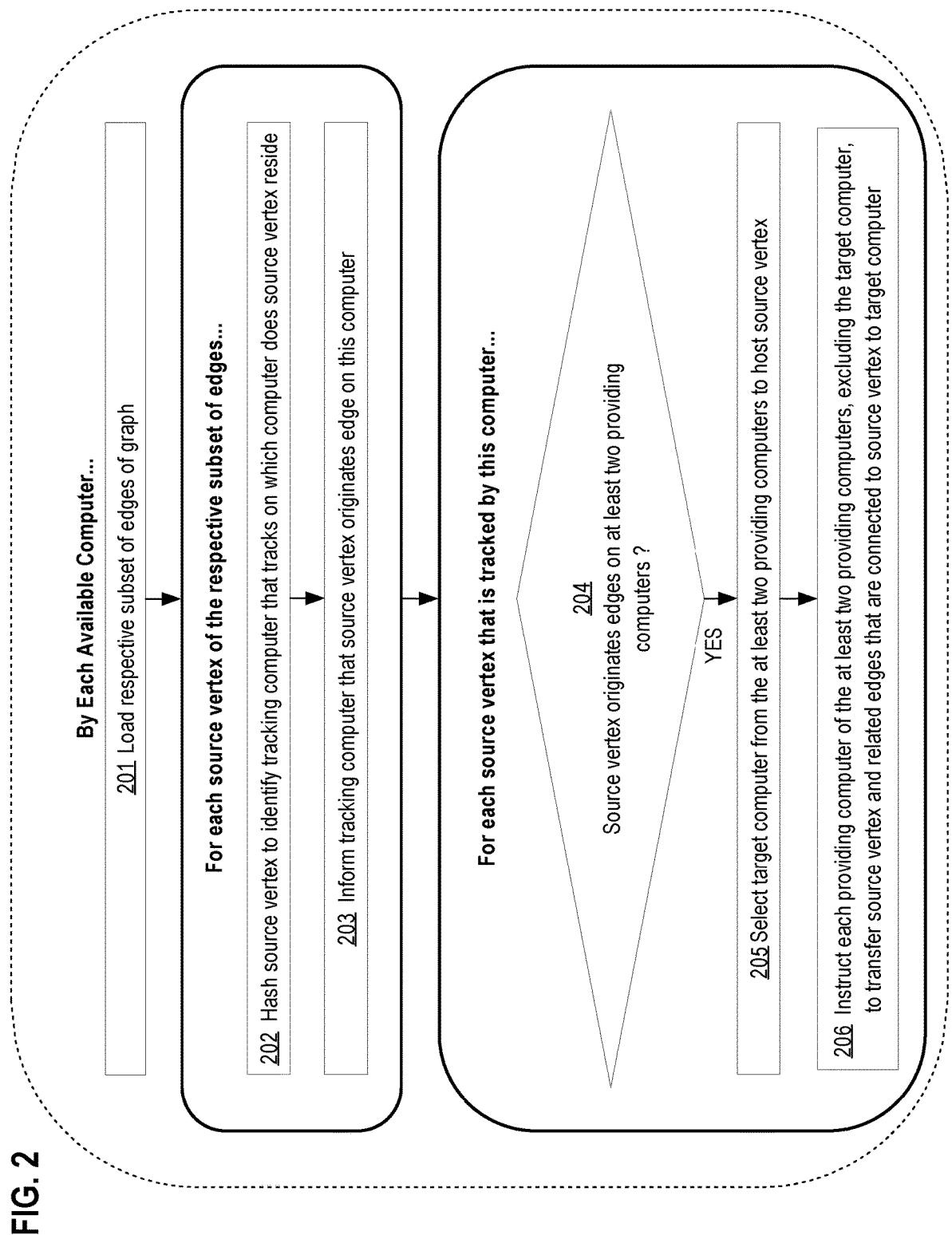
FIG. 2 is a flow diagram that depicts an example process that minimizes communication while load balancing a graph, in an embodiment.

FIG. 2 is a flow diagram that depicts an example process that minimizes communication while load balancing a graph. FIG. 2 is discussed with reference to FIG. 1.

3.1 Loading

Computers 111-113 and 120 may be part of a computer cluster, such as a Beowulf cluster. Steps 201-203 may be performed by each computer of the cluster.

The computers need not be synchronized. For example, computer 111 may perform step 201 while computer 112 performs step 202.

In step 201, a computer loads its respective subset of edges of a graph. For example, each of computers 111-113 and 120 may load a more or less equal amount of edges from a file, database, or other source.

For example, graph 110 may be an resource description framework (RDF) graph whose edges are stored as triples in a triplestore. For example, computer 111 may load a range of triples into memory.

3.1.1 Vertex

Steps 202-203 are performed for each source vertex of the edge subset loaded by the computer. Steps 202-203 may be interleaved with step 201. For example, computer 113 may load edge 143 during step 201, perform steps 202-203 on edge 143, and then repeat steps 201-203 for another edge, such as 144.

In step 202, the source vertex is hashed to identify which tracking computer tracks on which computer does the source vertex reside. For example, computer 111 may apply a hash function to source vertex 131 to detect that source vertex 131 is tracked by tracking computer 120.

In embodiments, all vertices of graph 110 may be available within a vertex array, such as in a shared file. Each vertex may be globally identified by its offset within the vertex array.

The hash function may perform a modulo operation to calculate the remainder of the vertex offset along the count of available computers. For example, the cluster may have ten computers, and vertex 132 may occur at a zero-based offset of twelve within the vertex array.

Thus, 12% 10=two is the zero-based modular remainder for vertex 132. Likewise, the ten computers may be sequentially listed such that computer 112 occurs at a zero-based offset of two within the list of computers.

Thus, vertex 132 may hash to computer 112, which means that computer 112 tracks vertex 132. Thus regardless of which computer(s) vertex 132 actually resides on, vertex 132 is tracked by computer 112.

3.1.2 Informing

In step 203, the tracking computer is informed that the source vertex originates an edge that resides on this computer. For example, source vertex 131 may hash to tracking computer 120.

Computer 111 may inform tracking computer 120 that source vertex 131 originates an edge that resides on computer 111.

Steps 202-203 occur for each source vertex of graph 110. If a source vertex, such as 131, originates related edges, such as 141-143, that are loaded onto multiple providing computers, such as 111-113, then steps 202-203 occur multiple times for the same source vertex.

For example, steps 202-203 may occur three times for source vertex 131, because its three related edges are distributed to three providing computers. Each of these three occurrences of steps 202-203 is performed by a different providing computer.

All of these three occurrences of steps 202-203 involve a same tracking computer, such as 120, because the same source vertex is involved. Thus, providing computers inform 111-113 inform tracking computer 120 that they have edges that originate at source vertex 131.

Informing a tracking computer about multiple source vertices may be batched. For example, step 203 may occur in batches, even if step 202 does not.

In embodiments, a batch may consist essentially of an array of source vertex identifiers. In embodiments, a batch also contains identifiers of edges or of destination vertices.

3.2 Tracking

Steps 204-206 are performed by each tracking computer. In embodiments, all available computers operate as tracking computers.

Tracking computers need not be synchronized. For example, tracking computer 120 may perform step 205 while another tracking computer performs step 206.

In embodiments, all available computers operate as provider computers that may provide (transfer) edges to other computers for load balancing. In embodiments, all available computers operate as provider computers and as tracking computers.

In embodiments, no tracking computer performs step 204 until all computers have finished all occurrences of step 203. For example, a computer may be designated as a global barrier that is not released until all computers finish all occurrences of step 203. Thus, a global barrier may separate steps 203-204.

For example, each computer may be a tracking computer and be a providing computer that: (a) individually finishes all occurrences of step 203, (b) accordingly notifies the barrier computer that another computer has arrived at the barrier, and (c) waits for the barrier to be released before performing step 204. Eventually the barrier computer detects that all computers have arrived at the barrier and reacts by broadcasting the barrier's release to the waiting tracking computers which may then perform step 204.

Steps 204-206 are performed for each source vertex that is tracked by the tracking computer. Because each source vertex is tracked by only one tracking computer, steps 204-206 are performed only once per source vertex of graph 110.

3.2.1 Conflict

In step 204, the tracking computer detects whether or not a source vertex originates edges that respectively reside on at least two providing computers. For example, source vertex 131 may hash to tracking computer 120. Tracking computer 120 may detect that source vertex 131 originates edges that reside on providing computers 111-113.

Steps 205-206 are performed only if the source vertex originates edges that reside on multiple respective providing computers. In step 205, a target computer is selected from amongst the at least two providing computers.

For example, tracking computer 120 may select providing computer 112 to host source vertex 131. Selection may be based on criteria such as the providing computer with most available memory, with fewest edges or vertices, with most spare processing cycles (e.g. least CPU load), etc. To minimize communication, selection may be based on criteria such as the providing computer with most edges that originate and/or terminate at source vertex 131.

3.2.2 Instruct

In step 206, each providing computer of the at least two providing computers, excluding the selected target computer, is instructed to transfer the source vertex and related edges that the source vertex originates from the providing computer to the target computer. For example, source vertex 131 may: (a) be tracked by tracking computer 120, (b) be hosted by target providing computer 111, and (c) originate related edges 141-143 that respectively reside on providing computers 111-113.

Tracking computer 120 may instruct providing computer 112 to transfer related edges that originate from source vertex 131 to target providing computer 111. Likewise, tracking computer 120 may instruct providing computer 113 to transfer related edges that originate from source vertex 131 to target providing computer 111.

In embodiments, tracking computer 120 may associate (as a mapping) various source vertices with various target computers. In embodiments, this mapping may be used to construct transfer lists. Each transfer list identifies source vertices that were redundantly loaded by a given provider computer and belong on (should be transferred to) a given target computer.

In embodiments, step 206 is performed in bulk. For example, tracking computer 120 may create a transfer list for provider computer 112 that identifies source vertices (that provider computer 112 redundantly loaded) that tracking computer 120 decided to move to a particular target computer as selected in step 205.

A transfer list for providing computer 112 may indicate that source vertex 131 belongs on target computer 111.

During step 206, tracking computer 120 may send that transfer list to providing computer 112. For each source vertex in that transfer list, providing computer 112 may gather those edges that reside on providing computer 112 that originate from that source vertex.

Tracking computer 120 may send other transfer lists to providing computer 112 to move other source vertices to other target computers. Tracking computer may send those transfer lists to providing computer 112 as a batch of transfer lists during one occurrence of step 206 or individually send a different transfer list during separate occurrences of step 206.

3.3 Transfer

Providing computer 112 may send those edges to target computer 111, as specified by that received transfer list. Also during step 206, tracking computer 120 may send to providing computer 113 a different transfer list that also associates source vertex 131 with target computer 111.

Thusly, tracking computer 120 instructs providing computers 112-113. Providing computers 112-113 may react by respectively sending related edges 142-143 to target computer 111.

Providing computer 112 may send related edges to target computer 111 in batches. For other source vertices, providing computer 112 may receive transfer instructions from the same or other tracking computers.

After all providing computers have sent edges to target computers as instructed by tracking computers, graph 110 is more or less load balanced. The process shown in FIG. 2 establishes useful post conditions, such as the following.

Each vertex and each edge of graph 110 reside on only one computer. All of the edges of a source vertex reside on a same computer as the source vertex. Furthermore, the vertices of graph 110 are more likely to be evenly distributed (balanced) across the computers of distributed system 100 than before performing the process shown in FIG. 2.

4.0 Mapping

Figure 3:
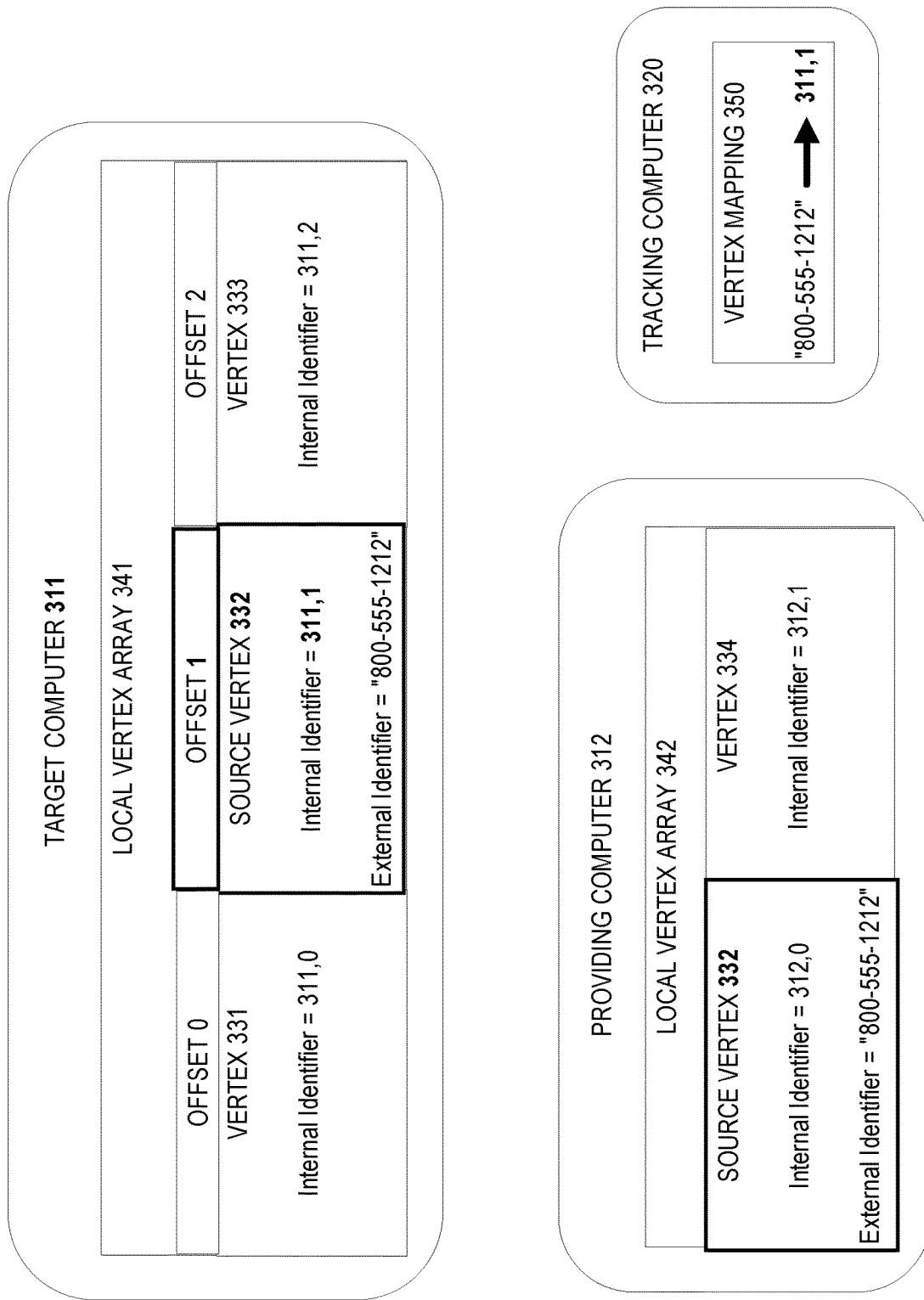
FIG. 3 is a block diagram that depicts an example distributed system that maps external identifiers of source vertices to internal identifiers, in an embodiment.

FIG. 3 is a block diagram that depicts example distributed system 300, in an embodiment. Distributed system 300 maps external identifiers of source vertices to internal identifiers.

Distributed system 300 may be an implementation of distributed system 100. Distributed system 300 includes computers 311-312 and 320.

4.1 External Identifier

Computers of distributed system 300, such as 311-312 and 320, may each load a respective portion of edges of a graph. As occurring in raw data being loaded, each edge may designate (with external identifiers) two vertices that it connects.

An external identifier of a vertex is globally unique within the graph. However, an external identifier may have inconvenient aspects.

An external identifier may be imposed by a data source that generated or otherwise provided the graph. An external identifier may be a natural identifier, such as a name, a street address, a phone number, etc.

External identifiers may be irregular in form or size. External identifiers may be expensive to scan, parse, store, or compare. An external identifier does not necessarily indicate on which computer does the vertex reside.

External identifiers may be sparse. For example, a sequence of external identifiers may have gaps.

4.2 INTERNAL IDENTIFIER

To accelerate processing or save space, a vertex may additionally be assigned an internal identifier. Internal identifiers have useful aspects.

For example, an internal identifier may be small, such as an integer. An internal identifier may have a fixed size.

An internal identifier may indicate on which computer does the vertex reside. In embodiments in addition to loading some edges, a computer may also load source vertices of those edges. In embodiments, destination vertices are also loaded.

4.3 Offset

In embodiments, vertices are loaded into a sequence, such as an array. For example, computer 311 loads vertices 331-333 into local vertex array 341.

In embodiments, only source vertices are loaded into local vertex array 341. In embodiments, source and destination vertices are loaded into local vertex array 341.

The offset of a vertex within local vertex array 341 may contribute to the internal identifier of the vertex. For example, vertex 331 has an internal identifier that indicates residence on computer 311 and residence within local vertex array 341 at offset zero.

Thus, internal identifiers may be contiguous and monotonous. This may enable straightforward iteration of local vertices by computer 311.

4.4 Conflict

However, source vertex 332 may originate edges that are loaded by different computers, such as 311-312. Thus, source vertex 332 may be redundantly loaded by computers 311-312 into local vertex arrays 341-342 at different array offsets.

Thus, computers 311-312 may each assign source vertex 332 a different internal identifier. A tracking computer may record which computer hosts a source vertex and also record which of the source vertex's internal identifiers should be globally used within distributed system 300.

For example, source vertex 332 may be tracked (as hashed) by tracking computer 320. Computers 311-312 may inform tracking computer 320 that they loaded source vertex 332.

Hashing source vertex 332 may involve hashing its external identifier. Thus, any computer may detect which tracking computer tracks source vertex 332, even if the computer has no internal identifier for source vertex 332.

Computer 311 may report its internal and external identifiers of source vertex 332 to tracking computer 320. Computer 312 may do the same, but report its own internal identifier for source vertex 332, which is different than the internal identifier reported by computer 311. However, both of computers 311-312 report the same external identifier for source vertex 332.

After being informed, tracking computer 320 may decide that target computer 311 should host source vertex 332. Tracking computer 320 may record this decision within source vertex mapping 350.

For the many source vertices that are tracked by tracking computer 320, vertex mapping 350 associates each vertex's external identifier with the vertex's internal identifier as reported by the target computer that tracking computer 320 selected to host the vertex. For example, vertex mapping 350 associates the external identifier of source vertex 332 with the internal identifier of source vertex 332 as reported by target computer 311.

4.5 Transfer

Tracking computer 320 also instructs providing computer 312 to transfer to target computer 311 edges loaded by providing computer 312 that originate from source vertex 332. This instruction contains the external and internal identifiers of source vertex 332 as stored in vertex mapping 350.

Within the instruction, the internal identifier of source vertex 332 indicates to providing computer 312 that source vertex 332 belongs on target computer 311. Thus, providing computer 312 may detect (as instructed) that edges it loaded that originate from source vertex 332 should be sent to target computer 311.

In embodiments, tracking computer 320 may send transfer instructions for many source vertices as a batch to providing computer 312. In embodiments, a batch of instructions may be sent in a single network message.

In embodiments, providing computer 312 transfers edges for multiple source vertices as a batch to target computer 311. In embodiments, a batch of transferred edges for multiple source vertices may be sent in a single network message.

In embodiments and after receiving a transfer instruction for source vertex 332, providing computer 312 may replace within local vertex array 342 the internal identifier of source vertex 332. For example, providing computer 312 may within local vertex array 342 change the internal identifier of source vertex 332 from 312,0 to 311,1.

5.0 Outbound

As described above, distributed systems 100 and 300 undergo various phases, including: (a) loading edges, (b) informing tracking computers about source vertices, (c) resolving conflicts by selecting target computers to host redundantly loaded source vertices, (d) instructing providing computers to transfer edges of redundantly loaded source vertices to target computers, and (e) edge transfer. Despite such work, resolution of destination vertices may be incomplete.

An outbound edge of a computer is an edge that originates from a source vertex that resides on the computer, but terminates at a destination that resides on another computer. As discussed above, vertex mappings (such as 350) on tracking computers may be remotely queried to resolve the destination vertices of outbound edges.

Figure 4:
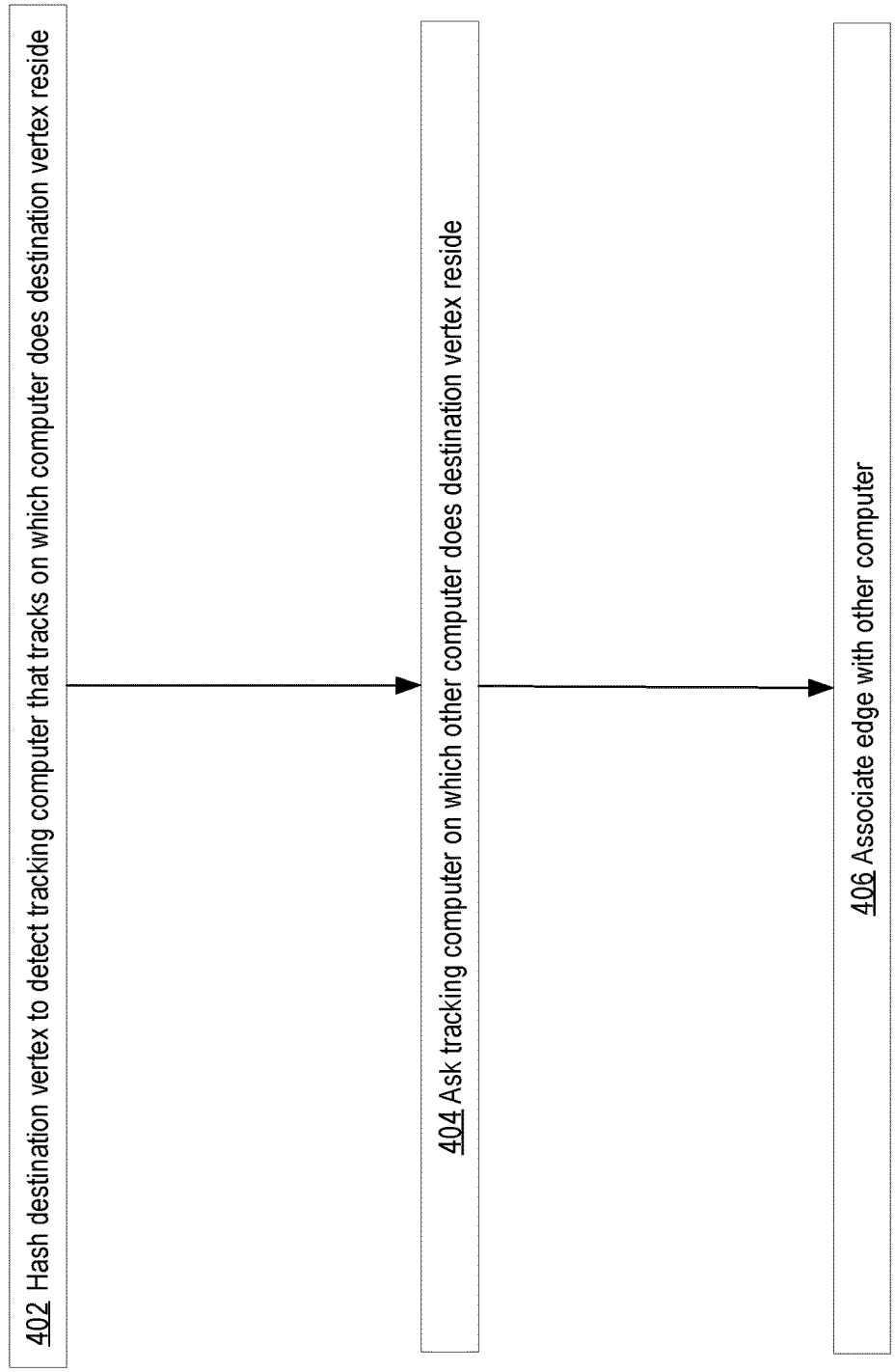
FIG. 4 is a flow diagram that depicts an example process that resolves outbound edges, in an embodiment.

FIG. 4 is a flow diagram that depicts an example process that resolves outbound edges. FIG. 4 is discussed with reference to FIG. 3.

Steps 402, 404, and 406 may be performed by each computer that loaded edges. Each computer may perform these steps for each outbound edge that the computer loaded.

In step 402, the destination vertex of an outbound edge is hashed to detect which tracking computer tracks on which computer does the destination vertex reside. For example, computer 311 may host source vertex 332 and may detect that source vertex 332 originates an outbound edge.

For example, the outbound edge may terminate at vertex 334 of computer 312, which computer 311 might not know. However, the outbound edge may contain the external identifier (not shown) of vertex 334. Computer 311 may hash the external identifier of vertex 334 to detect that vertex 334 is tracked by tracking computer 320.

5.1 Resolution

In step 404, the tracking computer is asked on which computer does the destination vertex reside. For example, computer 311 may send a request that bears the external identifier of vertex 334 to tracking computer 320.

Although vertex mapping 350 shows only one source vertex association, vertex mapping 350 may have associations for every source vertex that is tracked by tracking computer 320. Tracking computer 320 may use the external identifier of vertex 334 as a lookup key within vertex mapping 350 to detect what is the internal identifier and hosting computer of vertex 334.

Tracking computer 320 may report to computer 311 what is the internal identifier and hosting computer of vertex 334. Embodiments may involve bulk requests that bear external identifiers of many source vertices and that are answered with a bulk mapping that associates those external identifiers with internal identifiers. In embodiments, a bulk request or a bulk answer consists essentially of a single network message.

In step 406, the outbound edge is associated with the internal identifier of its destination vertex. The internal identifier may indicate on which computer does the destination vertex reside.

Step 406 involves forming an association. However, different embodiments may achieve this in different ways.

5.1.1 Scan

In embodiments, local vertex arrays 341-342 contain source and destination vertices. In embodiments, computer 311 may receive pairings of external and internal identifiers of destination vertices from tracking computer 320.

In embodiments, computer 311 receives only internal identifiers of destination vertices from tracking computer 320, but in the same relative ordering of destination vertices as external identifiers were sent by computer 311 in step 404. Computer 311 may use this duplicated ordering to correlate a particular sent external identifier with a particular received internal identifier.

In embodiments, computer 311 may sequentially scan local vertex array 341 in search of the external identifier of the source vertex for which tracking computer 320 answered. For example in addition to occurring in local vertex array 342, vertex 334 may also occur at offset 3 (not shown) in local vertex array 341.

Thus sequential scanning may find vertex 334 at offset 3 of local vertex array 341. At offset 3, computer 311 may update the internal identifier of vertex 334 by storing the internal identifier of vertex 334 as received from tracking computer 320. Thus, computer 311 associates destination vertex 334 with a global internal identifier that may indicate a hosting computer of vertex 334.

In embodiments, computer 311 sent (e.g. in a batch) to tracking computer 320 requests for all outbound edges of computer 311 during step 404. However, multiple outbound edges of computer 311 may originate at different source vertices but terminate at a same destination vertex, which may mean that computer 311 repeats a same external identifier of the same destination vertex multiple times in the batch request. In embodiments, computer 311 detects such duplicates and instead mentions that external identifier only once in the batch request.

5.1.2 Random Access

In embodiments, local vertex arrays 341-342 contain source vertices but not destination vertices. Computer 311 may have an array of edges that computer 311 loaded.

For example, source vertex 332 may originate an outbound edge that computer 311 loaded into the edge array and that terminates at vertex 334. The outbound edge resides in the edge array at some offset.

During step 404, computer 311 sent a request for mapping information for vertex 334 by sending the external identifier of vertex 334 to tracking computer 320. In embodiments, the request includes the offset within the edge array of the outbound edge.

Tracking computer 320 may include in its answer for the request the edge offset that was included in the request. Upon receiving this answer, computer 311 may use the offset included in the answer for random access into the edge array to correlate the answer with the outbound edge.

Computer 311 may update the outbound edge within the edge array by storing the internal identifier of vertex 334 to indicate that the outbound edge terminates at vertex 334. The internal identifier may indicate that vertex 334 resides on computer 312.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
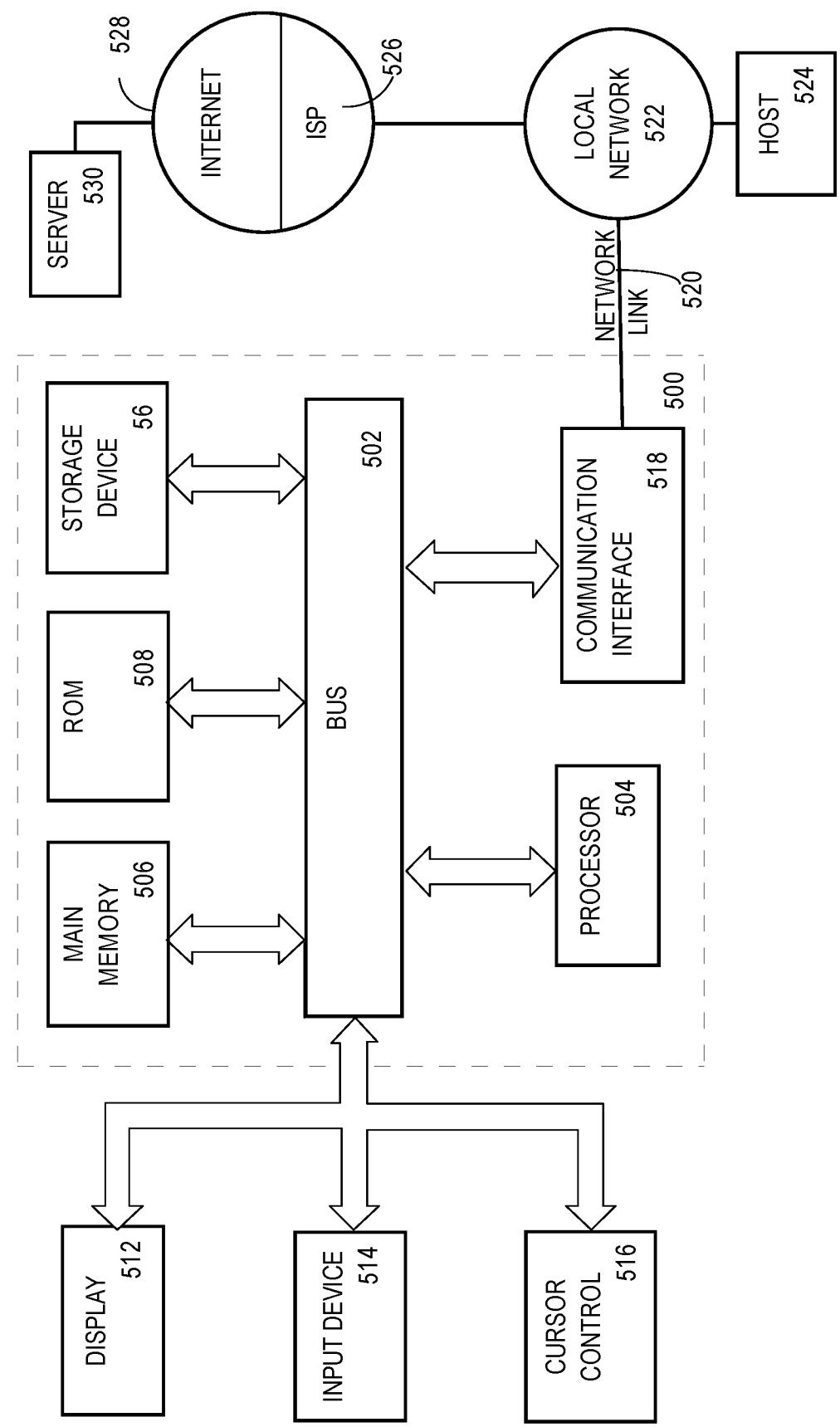
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 56, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 56. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 56. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 56 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 56, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   by each computer of a plurality of computers:
   loading a respective subset of edges of a graph, wherein each edge of the respective subset of edges connects a source vertex of the graph to a destination vertex of the graph, wherein said edge may load on each computer of a respective subset of the plurality of computers;
   for each source vertex of the respective subset of edges:
   hashing the source vertex to identify a respective tracking computer of the plurality of computers that tracks on which computer of the plurality of computers does the source vertex reside; and
   informing the respective tracking computer that the source vertex originates an edge that resides on the computer;
   after the plurality of computers have completed said loading respective subsets of edges, by each computer of the plurality of computers:
   for each source vertex that is tracked by the computer, when the source vertex originates at least one edge that respectively resides on at least two providing computers of the plurality of computers:
   selecting a respective target computer from the at least two providing computers to host the source vertex; and
   instructing each providing computer of the at least two providing computers, excluding the respective target computer, to transfer the source vertex and related edges of the respective subset of edges of the providing computer that are connected to the source vertex to the respective target computer.

2. The method of claim 1 wherein:
   informing the respective tracking computer that the source vertex resides on the computer comprises sending an internal identifier and an external identifier of the source vertex;
   instructing each providing computer to transfer the source vertex comprises sending to the providing computer at least one of: the internal identifier or the external identifier of the source vertex.

3. The method of claim 2 further comprising maintaining a map that associates internal identifiers with external identifiers.

4. The method of claim 2 wherein the internal identifier of the source vertex comprises an identifier of which computer of the plurality of computers does the source vertex reside.

5. The method of claim 1 wherein:
selecting the respective target computer to host the source vertex comprises detecting that the respective target computer has the most available capacity of the at least two providing computers;
the most available capacity comprises at least one of: the most available memory, or the least source vertices of the respective subset of edges.

6. The method of claim 1 wherein informing the respective tracking computer that the source vertex resides on the computer comprises sending a count of edges that reside on the computer and originate from the source vertex.

7. The method of claim 1 further comprising by each computer of the plurality of computers:
for each outbound edge of the respective subset of edges that does not terminate at a destination vertex that resides on the computer:
hashing the destination vertex to detect a second tracking computer of the plurality of computers that tracks on which computer of the plurality of computers does the destination vertex reside;
asking the second tracking computer on which other computer does the destination vertex reside;
associating the outbound edge with the other computer.

8. The method of claim 7 wherein asking the second tracking computer comprises sending an offset, within the respective subset of edges, of the edge.

9. The method of claim 7 wherein asking the second tracking computer on which other computer does the destination vertex reside consists essentially of sending a single message asking on which other computers do multiple destination vertices reside.

10. The method of claim 1 wherein at least one of:
informing the respective tracking computer that the source vertex resides on the computer comprises a single message informing the respective tracking computer that multiple source vertices resides on the computer, or
instructing the providing computer to transfer the source vertex comprises a single message instructing the providing computer to transfer multiple source vertices.

11. One or more non-transitory computer-readable media storing instructions that, when executed by one or more processors, cause:
by each computer of a plurality of computers:
loading a respective subset of edges of a graph, wherein each edge of the respective subset of edges connects a source vertex of the graph to a destination vertex of the graph, wherein said edge may load on each computer of a respective subset of the plurality of computers;
for each source vertex of the respective subset of edges:
hashing the source vertex to detect a respective tracking computer of the plurality of computers that tracks on which computer of the plurality of computers does the source vertex reside; and
informing the respective tracking computer that the source vertex originates an edge that resides on the computer;
after the plurality of computers have completed said loading respective subsets of edges, by each computer of the plurality of computers:
for each source vertex that is tracked by the computer, when the source vertex originates at least one edge that respectively resides on at least two providing computers of the plurality of computers:
selecting a respective target computer from the at least two providing computers to host the source vertex; and
instructing each providing computer of the at least two providing computers, excluding the respective target computer, to transfer the source vertex and related edges of the respective subset of edges of the providing computer that are connected to the source vertex to the respective target computer.

12. The one or more non-transitory computer-readable media of claim 11 wherein:
informing the respective tracking computer that the source vertex resides on the computer comprises sending an internal identifier and an external identifier of the source vertex;
instructing each providing computer to transfer the source vertex comprises sending to the providing computer at least one of: the internal identifier or the external identifier of the source vertex.

13. The one or more non-transitory computer-readable media of claim 12 wherein the instructions, when executed by the one or more processors, further cause maintaining a map that associates internal identifiers with external identifiers.

14. The one or more non-transitory computer-readable media of claim 12 wherein the internal identifier of the source vertex comprises an identifier of which computer of the plurality of computers does the source vertex reside.

15. The one or more non-transitory computer-readable media of claim 11 wherein:
selecting the respective target computer to host the source vertex comprises detecting that the respective target computer has the most available capacity of the at least two providing computers;
the most available capacity comprises at least one of: the most available memory, or the least source vertices of the respective subset of edges.

16. The one or more non-transitory computer-readable media of claim 11 wherein informing the respective tracking computer that the source vertex resides on the computer comprises sending a count of edges that reside on the computer and originate from the source vertex.

17. The one or more non-transitory computer-readable media of claim 11 wherein the instructions, when executed by the one or more processors, further cause each computer of the plurality of computers to:
for each outbound edge of the respective subset of edges that does not terminate at a destination vertex that resides on the computer:
hash the destination vertex to detect a second tracking computer of the plurality of computers that tracks on which computer of the plurality of computers does the destination vertex reside;
ask the second tracking computer on which other computer does the destination vertex reside;
associate the outbound edge with the other computer.

18. The one or more non-transitory computer-readable media of claim 17 wherein ask the second tracking computer comprises send an offset, within the respective subset of edges, of the edge.

19. The one or more non-transitory computer-readable media of claim 17 wherein ask the second tracking computer on which other computer does the destination vertex reside consists essentially of send a single message asking on which other computers do multiple destination vertices reside.

20. The one or more non-transitory computer-readable media of claim 11 wherein at least one of:
- informing the respective tracking computer that the source vertex resides on the computer comprises a single message informing the respective tracking computer that multiple source vertices resides on the computer, or
- instructing the providing computer to transfer the source vertex comprises a single message instructing the providing computer to transfer multiple source vertices.

\* \* \* \* \*